United States Patent
Hua et al.

(10) Patent No.: US 8,131,086 B2
(45) Date of Patent: Mar. 6, 2012

(54) KERNELIZED SPATIAL-CONTEXTUAL IMAGE CLASSIFICATION

(75) Inventors: Xian-Sheng Hua, Beijing (CN); Guo-Jun Qi, Beijing (CN); Yong Rui, Sammamish, WA (US); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 731 days.

(21) Appl. No.: 12/237,298

(22) Filed: Sep. 24, 2008

(65) Prior Publication Data

US 2010/0074537 A1    Mar. 25, 2010

(51) Int. Cl.
*G06K 9/68* (2006.01)

(52) U.S. Cl. ...................................... 382/226

(58) Field of Classification Search .............. 382/173, 382/180, 181, 226, 224
See application file for complete search history.

(56) References Cited

U.S. PATENT DOCUMENTS

| | | | |
|---|---|---|---|
| 5,808,219 | A | 9/1998 | Usa |
| 6,687,404 | B1 * | 2/2004 | Hull et al. ............. 382/226 |
| 6,823,086 | B1 | 11/2004 | Dolazza |
| 7,076,102 | B2 | 7/2006 | Lin et al. |
| 7,194,134 | B2 | 3/2007 | Bradshaw |
| 7,200,243 | B2 | 4/2007 | Keenan et al. |
| 7,245,767 | B2 | 7/2007 | Moreno et al. |
| 2005/0259889 | A1 | 11/2005 | Ferrari et al. |
| 2007/0183493 | A1 | 8/2007 | Kimpe |

FOREIGN PATENT DOCUMENTS

EP    1850271 A1    10/2007

OTHER PUBLICATIONS

He, et al., "Multiscale Conditional Random Fields for Image Labeling", 2004 IEEE Computer Society Conference on Computer Vision and Pattern Recognition (CVPR'04)—vol. 2 pp. 695-702.
Kim, et al., "Support Vector Machines for Texture Classification", IEEE Transactions on Pattern Analysis and Machine Intellegence, vol. 24, No. 11, Nov. 2002. pp. 1542-1550.
Chan, et al., "Probabilistic Kernels for the Classification of Auto-Regressive Visual Processes", Jun. 2005. 8 pages.
Suresh, et al., "Combining Multiple Evidence for Video Classification", This paper appears in: Proceedings of 2005 International Conference on Intelligent Sensing and Information Processing, 2005. Publication Date: Jan. 4-7, 2005 on pp. 187-192.
Tang, et al., "Optimizing Training Set Construction for Video Semantic Classification", Hindawi Publishing Corporation EURASIP Journal on Advances in Signal Processing vol. 2008, Article ID 693731, 10 Pages.

(Continued)

*Primary Examiner* — Duy M Dang
(74) *Attorney, Agent, or Firm* — Alleman Hall McCoy Russell & Tuttle LLP

(57) ABSTRACT

Kernelized spatial-contextual image classification is disclosed. One embodiment comprises generating a first spatial-contextual model to represent a first image, the first spatial-contextual model having a plurality of interconnected nodes arranged in a first pattern of connections with each node connected to at least one other node, generating a second spatial-contextual model to represent a second image using the first pattern of connections, and estimating the distance between corresponding nodes in the first spatial-contextual model and the second spatial-contextual model based on a relationship with adjacent connected nodes to determine a distance between the first image and the second image.

20 Claims, 3 Drawing Sheets

OTHER PUBLICATIONS

Fei-Fei, et al., "A Bayesian Hierarchical Model for Learning Natural Scene Categories", IEEE Computer Society Conference on Computer Vision and Pattern Recognition, 2005. CVPR 2005. pp. 1-8.

Grauman, et al., "The Pyramid Match Kernel: Discriminative Classification with Sets of Image Features", Proceedings of the Tenth IEEE International Conference on Computer Vision (ICCV'05).

Chen, et al., "MILES: Multiple-Instance Learning via Embedded Instance Selection", IEEE Transactions on Pattern Analysis and Machine Intelligence, vol. 28, No. 12, Dec. 2006.

Lowe, "Object Recognition from Local Scale-Invariant Features", Seventh International Conference on Computer Vision (ICCV'99)—vol. 2. 8 Pages.

Quattoni, et al., "Conditional Random Fields for Object Recognition", In Advances in Neural Information Processing Systems 17 (NIPS 2004), 2005. 8 Pages.

Fergus, et al., "Object Class Recognition by Unsupervised Scale-Invariant Learning", Proceedings of the 2003 IEEE Computer Society Conference on Computer Vision and Pattern Recognition (CVPR'03). 8 Pages.

Li, et al. "Image Classification by a Two-Dimensional Hidden Markov Model", IEEE Transactions on Signal Processing, vol. 48, No. 2, Feb. 2000. pp. 517-533.

Yu, et al., "Automatic Semantic Annotation of Images using Spatial Hidden Markov Model", 2006 IEEE International Conference on Multimedia and Expo. pp. 305-308.

Li, et al. "Automatic Linguistic Indexing of Pictures by a Statistical Modeling Approach", IEEE Transactions on Pattern Analysis and Machine Intelligence, vol. 25, No. 9, Sep. 2003. pp. 1075-1088.

Perronnin, et al., "Fisher Kernels on Visual Vocabularies for Image Categorization", IEEE Conference on Computer Vision and Pattern Recognition, 2007. 8 Pages.

Yu, et al., "Distance Learning for Similarity Estimation", IEEE Transactions on Pattern Analysis and Machine Intelligence, vol. 30, No. 3, Mar. 2008. pp. 451-462.

Wallraven, et al., "Recognition with Local Features: the Kernel Recipe", Proceedings of the Ninth IEEE International Conference on Computer Vision (ICCV'03). 8 pages.

Zhang, et al., "SVM-KNN: Discriminative Nearest Neighbor Classification for Visual Category Recognition", Proceedings of the 2006 IEEE Computer Society Conference on Computer Vision and Pattern Recognition (CVPR'06). 8 pages.

Lazebnik, et al., "Beyond Bags of Features: Spatial Pyramid Matching for Recognizing Natural Scene Categories", 2006 IEEE Computer Society Conference on Computer Vision and Pattern Recognition. vol. 2, pp. 2169-2178.

Singer, et al., "Batch and On-line Parameter Estimation of Gaussian Mixtures Based on the Joint Entropy", Proceedings of the 1998 conference on Advances in neural information processing systems II. pp. 578-584. Year of Publication: 1999.

Chang, et al., "LIBSVM: a Library for Support Vector Machines", May 13, 2008. pp. 1-27.

Gauvain, et al., "Maximum a Posteriori Estimation for Multivariate Gaussian Mixture Observations of Markov Chains", IEEE Transactions on Speech and Audio Processing. vol. 2, No. 2, Apr. 1994. pp. 291-298.

Kadir, et al., "Saliency, Scale and Image Description", International Journal of Computer Vision 45(2), 83-105, 2001.

Lin, et al., "Local Ensemble Kernel Learning for Object Category Recognition", 2007 IEEE Conference on Computer Vision and Pattern Recognition. 8 Pages.

\* cited by examiner

KERNELIZED SPATIAL-CONTEXTUAL IMAGE CLASSIFICATION

BACKGROUND

Image/video classification involves categorizing a collection of unlabeled images into a set of predefined classes for semantic level image retrieval. In some approaches, images are modeled by segmenting the image into patches. Then, the patches are compared to a reference image based on aspects of each patch, such as color, texture, etc. An additional factor that may be considered in image classification is the spatial context between the local patches of images. Spatial-contextual models attempt to depict the spatial structures of images in a class by constructing one common model for each image category.

In one example, a two dimensional Hidden Markov Model (2D HMM) may be used for image categorization, by generating a learned model from a training set of images for each image class. Then, the learned model is used to score the probability of an unlabeled image belonging to a certain class of images. However, a subject image category may have a large intra-class variance, making it is difficult to represent various spatial contexts in different images using a single model. For example, the images for a specific category may differ by view, such as top view, side view, front view and back view. Each view may have a different spatial context related to its respective local patches. These differences may reduce the depictive ability of a single model to capture a large intra-class variance between images.

SUMMARY

Accordingly, various embodiments for kernelized spatial-contextual image classification are described below in the Detailed Description. For example, one embodiment comprises generating a first spatial-contextual model to represent a first image, the first spatial-contextual model having a plurality of interconnected nodes arranged in a first pattern of connections with each node connected to at least one other node, generating a second spatial-contextual model to represent a second image using the first pattern of connections, and estimating the distance between corresponding nodes in the first spatial-contextual model and the second spatial-contextual model based on a relationship of adjacent connected nodes to determine a distance between the first image and the second image.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Generally, a prototype set of spatial-contextual models may be constructed by leveraging a kernel method in contrast to using only a single model for an image category in image classification. Such an approach provides the representation ability of spatial-contextual models as well as the classification ability of kernel methods. For example, this approach can generate a distance measure between different spatial-contextual models by integrating joint appearance-spatial image features. Such a distance measure can be efficiently computed in a recursive formulation that may also scale well to a range of image sizes, and upper-bounded for the distance between the two models can be computed.

Figure 1:
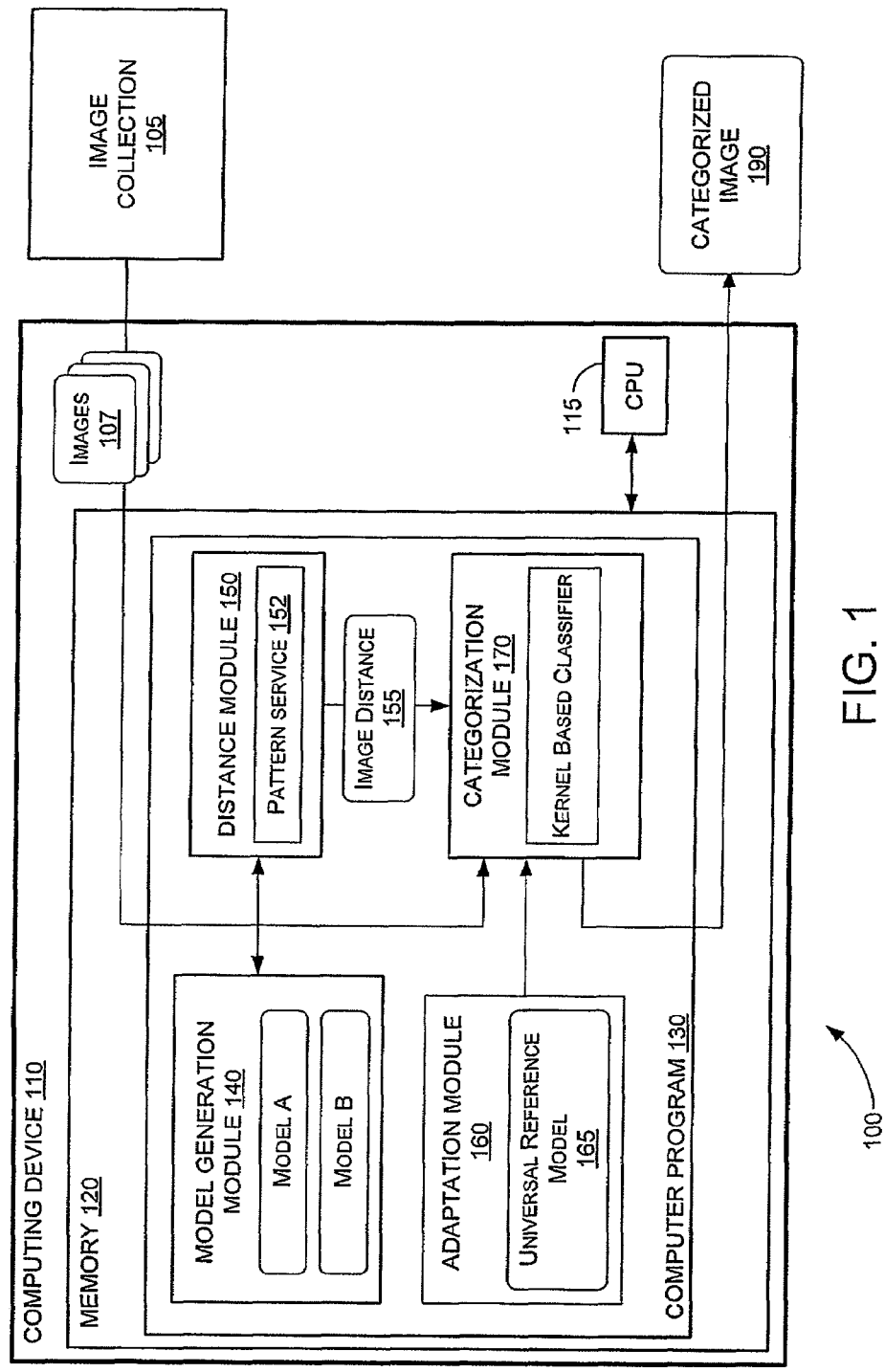
FIG. 1 shows an example of an embodiment of a system for kernelized spatial-contextual image classification.

FIG. 1 shows an example of an embodiment of a system 100 to categorize a plurality of unlabeled images comprising a computing device 110 with an input, a memory 120, a processor 115 in communication with the input and the memory, and a computer program 130 in memory 120 that may be run by processor 115.

Computing device 110 further comprises a model generation module 140 in communication with a distance module 150, and a categorization module 170. Model generation module 140 may be configured to generate a plurality of spatial-contextual models of images 107 from an image collection 105. Distance module 150 may further include a pattern service 152, and uses the pattern service 152 to recognize nodal relationships in spatial-contextual models and calculate an image distance 155 between spatial-contextual models. Categorization module 170 then uses the image distance 155 to generate a categorized image 190, as described below.

In one embodiment, model generation module 140 may be configured to generate a first Dependency Tree Hidden Markov Model (DT-HMM) to represent a first image and a second DT-HMM to represent a second image. Then, the distance module 150 may to calculate an image distance 155 between the first DT-HMM and the second DT-HMM based on formulas for different distance estimations based on a nodal structure in corresponding nodes of the first DT-HMM and the second DT-HMM. In this way, categorization module 170 to receive the image distance and to generate a kernelized spatial-contextual model using the image distance.

In one embodiment, an upper-bounded distance between two images may be obtained by a Maximum A Posteriori (MAP) adaptation where each statistical model for an image is adapted from a Universal Reference Model (URM). For example, a URM may be constructed from a collection of referential images. Therefore, once the upper-bound is obtained, a kernel function can be generated in a kernel-based classifier, such as Support Vector Machine (SVM), and then used for image categorization.

Figure 2:
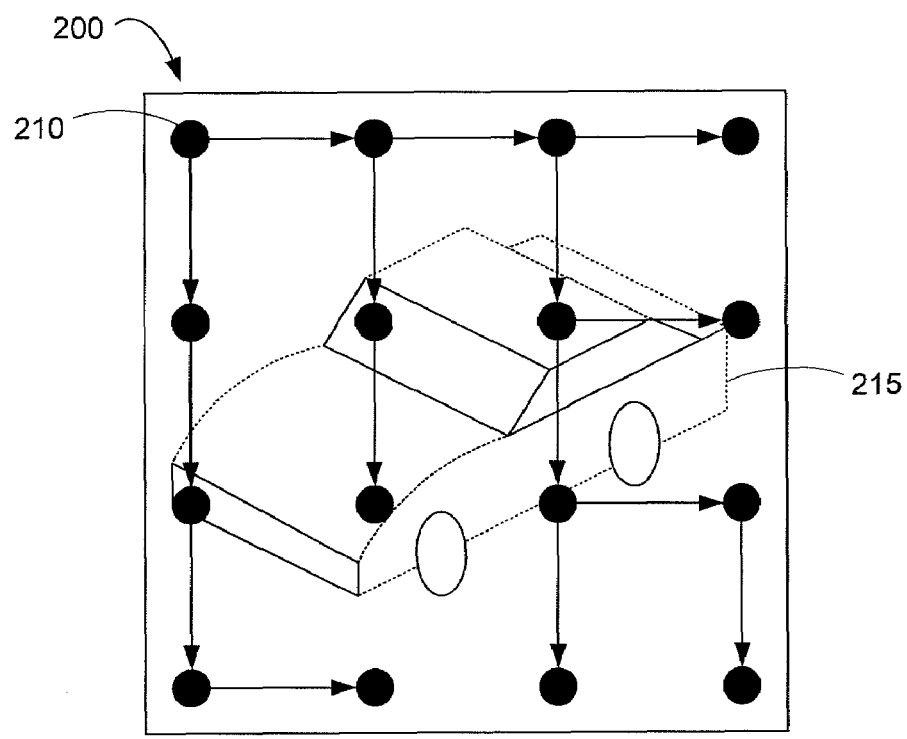
FIG. 2 shows an image of a car in the perspective view with a dependency tree hidden Markov model.

As described above, a disadvantage of a conventional 2D-HMM approach is the use of a single model to represent an image class. This can be problematic when an image class has a large intra-class variance. Briefly turning to FIG. 2, an image 200 of a car 215 in perspective view with a DT-HMM structure 210 overlaying the image. However, other images of a car may be from the front of the car, the back, the side, the top, etc. Each of these has a different spatial-context based on the image perspective. If a single model is used to represent an image class, the intra-class variance of the different perspectives would therefore generate a range of distance calculations based on different image perspectives.

In one embodiment, a set of prototype models may be constructed, each model capturing one prototype in a subject class. For example, for an image class of the car 215, multiple prototype models may be constructed to represent different perspectives of car 215. Then, the multiple prototypes can be combined to generate a spatial-contextual model for a car class.

Referring back to FIG. 1, an embodiment computing device 110 may comprise an adaptation module 160 in communication with the categorization module 170, wherein the adaptation module 160 may be configured to train a universal reference model 165 from a plurality of representative images. In this way, the categorization module may generate a set of kernelized spatial-contextual models to accommodate intra-class variance in a range of representative images containing a subject semantic content.

We now describe aspects of this approach illustrated in FIG. 1 in more detail. Given a set of training images $\{x_i\}_{i=1}^n$ and associated labels $\{y_i\}_{i=1}^n$, an individual 2D HMM $\{\Theta_i\}_{i=1}^n$ may be generated based on each image. By computing a similarity measure between each of these models, a kernel function $k(\Theta, \Theta_i)$ can be calculated between two models $\Theta, \tilde{\Theta}$. Using this kernel function, a prediction function can then be learned using a SVM approach according to the following equation:

$$f(\Theta) = \text{sgn}\left\{\sum_{i=1}^n y_i \alpha_i k(\Theta, \Theta_i) + b\right\} \quad (1)$$

where sgn $\{\cdot\}$ represents the sign function.

Therefore, $\Theta$ and $\Theta_i$ represent the 2D-HMM learned from the images and $a_i$ and $b$ provide a coefficient and bias in equation (1). This function may be used to provide a predicted label for an image associated with model $\Theta$. Additionally, $\Theta_i$s associated with $a_i \neq 0$ may act as support vectors in a SVM approach and may then be considered as prototypes for an image class to discriminate the image class from the other categories. Referring back to the car example, the images of the car from different perspectives may be used to create a set of support vectors that may be combined in equation (1). Next, a similarity measure between different images based on their respective 2D-HMM will be described.

As stated above, an individual 2D-HMM may first be used to represent an image. In this way, a 2D-HMM is trained from an associated image. In contrast, in a spatial-contextual approach, a representation model (i.e., 2D-HMM) may be separately used from a prediction model (i.e., SVM). For the representation model, a model is fit into an image to represent it. For the prediction model, a corresponding SVM model may be trained based on the obtained similarities between the fitted models. Therefore, such a framework combines the 2D-HMM ability to represent the spatial contexts of images, as well as the prediction ability of SVM to discriminate image classes.

We now describe a DT-HMM probabilistic modeling approach in more detail. Similar to a 2D-HMM, in a DT-HMM approach a 2D observation may be denoted by $O=\{o_{i,j}, i=1,\ldots,R, j=1,\ldots,C\}$, where each $O_{i,j}$ is a feature vector of a block (i, j) in an image. For Q states $\{1, \ldots, Q\}$, the state of a block (i, j) is denoted by $s_{i,j}$. Under the dependency assumption in 2D-HMM, each state $s_{i,j}$ then depends on its two neighbors $s_{i-1,j}, s_{i,j-1}$ which in turn causes the computation complexity of a learning procedure and an inference procedure to grow considerably as image size increases. In contrast, in a DT-HMM approach, an assumption is made that $s_{i,j}$ depends on one neighbor at a time. This neighbor may be a horizontal neighbor or a vertical neighbor, depending on a random variable $t_{i,j}$ with the following distribution:

$$P(t(i,j) = (i-1,j)) = P(t(i,j) = (i,j-1)) = \frac{1}{2} \quad (2)$$

It is worth noting that for the first row or the first column of a DT-HMM, $t_{i,j}$ has only one valid horizontal or vertical value and the root node T (1, 1) is not defined. Therefore, a transition probability distribution can be simplified for vertical transition probability distribution $P_V$ and for horizontal transition probability distribution $P_H$ respectively as:

$$P(s_{i,j}|s_{i-1,j},s_{i,j-1})=\{P_V(s_{i,j}|s_{i-1,j}), t(i,j)=(i-1,j)\} \text{ and}$$

$$P(s_{i,j}|s_{i-1,j},s_{i,j-1})=\{P_H(s_{i,j}|s_{i,j-1}), t(i,j)=(i,j-1)\} \quad (3)$$

Figure 3:
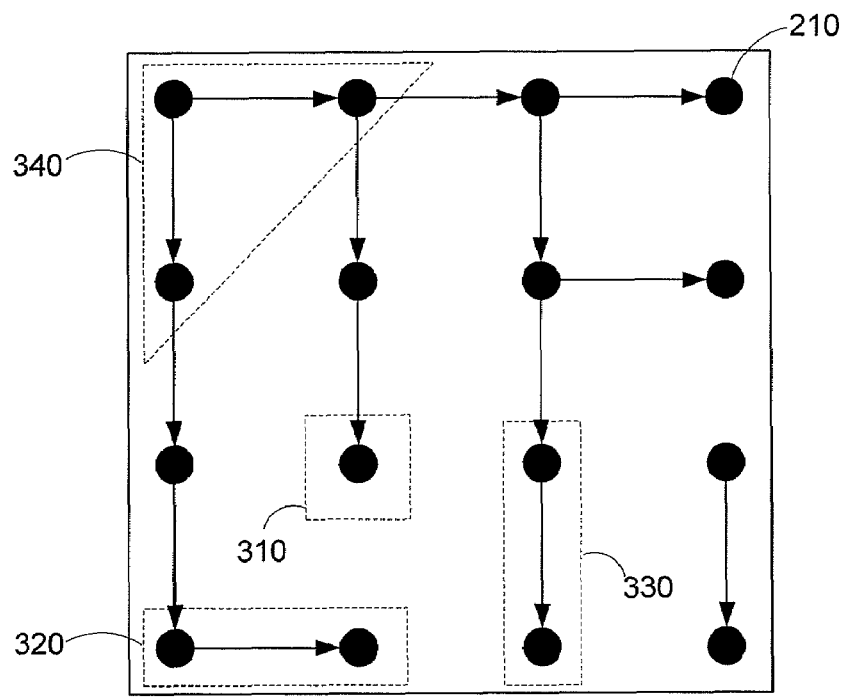
FIG. 3 shows representative nodes in the dependency tree hidden Markov model from FIG. 2.

In this example, the random variables t for all (i,j) therefore define a tree-structured dependency over all positions with (1,1) as the root. FIG. 3 illustrates such an example dependency tree structure and illustrates example nodal structures, including node arrangement 310 with no successor node, node arrangement 320 with a horizontal successor node, node arrangement 330 with a vertical successor node, and node arrangement 340 with a horizontal and a vertical successor node. In one embodiment, these different node structures may use a corresponding different distance calculations between corresponding DT-HMMs, as explained in the following paragraphs.

In a DT-HMM, given a state $s_{i,j}$, an observation $o_{i,j}$ may be generated according to distribution $P(o_{i,j}|s_{i,j})$. For example, a Gaussian Mixture Model (GMM) may provide an observation distribution. In a multi-modal setting, the observation $o_{i,j}$ may have M feature cues $\{o_{i,j}^k\}_{k=1}^M$ from different sources. By assuming these M types of features can be generated independently once a corresponding state $s_{i,j}$ is given, we have:

$$P(\{o_{i,j}^k\}_{k=1}^M | s_{i,j} = q) = \prod_{k=1}^M P(o_{i,j}^k | s_{i,j} = q) \quad (4)$$

$$= \prod_{k=1}^M \sum_{l=1}^N \lambda_{k,l}^q N\left(o_{i,j}^k | \mu_{k,l}^q, \sum_{k,l}^q\right)$$

where $$\lambda_{k,l}^q, \mu_{k,l}^q, \sum_{k,l}^q$$

is a mixing coefficient, a mean vector and a covariance matrix of lth Gaussian component for the kth modality, respectively, given the current state is q.

For simplicity, the covariance matrix may be assumed to be diagonal. The independence assumption holds given hidden states are fixed, but for the 2D observation such an independence assumption does not hold across different modalities, i.e. $P(O^1, \ldots O^M) \neq P(O^1) \ldots P(O^M)$.

A DT-HMM may be used to encode both the appearance and the spatial structure of an image. If a distance is computed between DT-HMMs, an appearance-spatial discrimination can be measured across the images. The Kullback-Leibler Divergence (KLD) from information theory provides a distance measure between the statistical models.

Specifically, a DT-HMM may be specified by the parameter set $\Theta=\{\pi, a^H, a^V, \lambda, \mu, \Sigma\}$, where $\pi$ is the initial state distribution; $a^H, a^V$ is the horizontal and vertical transition matrix with $a_{m,n}^H = P_H(s_{i,j}=n|s_{i,j-1}=m)$, $a_{m,n}^V = P_H(s_{i,j}=n|s_{i-1,j}=m)$; and $\lambda, \mu, \Sigma$ are the parameters for the observation distribution specified in equation (4). Using this observation distribution, a joint distribution of the 2D observation $O=\{o_{i,j}^k, i=1,\ldots,R, j=1,\ldots,C, k=1,\ldots,M\}$ and state $S=\{s_{i,j}, i=1,\ldots,R, j=1,\ldots,C\}$ is:

$$P(O,S|\Theta) = P(O|S,\Theta)P(S|\Theta) = \Pi_{i,j}P(o_{i,j}|s_{i,j},\Theta) P(s_{i,j}|s_{i-1,j},s_{i,j-1}) \quad (5)$$

and a 2D observation distribution can be obtained by summarizing S as $$P(O|\Theta) = \sum_S P(O,S|\Theta) \quad (6)$$

Therefore, the KLD between two DT-HMMs $\Theta, \tilde{\Theta}$ is:

$$KL=(\Theta\|\tilde{\Theta}) = \int P(O|\Theta)\log\frac{P(O|\Theta)}{P(O|\tilde{\Theta})} \quad (7)$$

Unfortunately, there is not a closed form expression for the KLD between these two DT-HMMs, but an approximation may be used. The approximation is motivated from the following lemma that is based on the log-sum inequality: Given two mixture distributions $$f = \sum_{i=1}^{L} w_i f_i \text{ and } g = \sum_{i=1}^{L} v_i g_i,$$

the KLD between them is upper bounded by:

$$KL(f\|g) \leq KL(w\|v) + \sum_{i=1}^{L} w_i KL(f_i\|g_i) \quad (8)$$

where $$KL(w\|v) = \sum_{i=1}^{L} w_i \log\frac{w_i}{v_i},$$

following the log-sum inequality.

Given this lemma, the KLD between DT-HMMs can be computed as follows. Let $T(i, j)$ be a sub-tree rooted at position $(i,j)$, and $\beta_{i,j}(q)$ be a probability that the portion of a respective image is covered by $T(i, j)$ with a state q in position $(i,j)$. Then the 2D observation distribution is:

$$P(O|\Theta) = \sum_{q=1}^{Q} \pi_q \beta_{1,1}(q) \quad (9)$$

Accordingly, the KLD between two DT-HMMs may be calculated according to:

$$KL(\Theta\|\tilde{\Theta}) = KL\left(\sum_{q=1}^{Q} \pi_q \beta_{1,1}(q) \middle\| \sum_{q=1}^{Q} \tilde{\pi}_q \tilde{\beta}_{1,1}(q)\right) \leq KL(\pi\|\tilde{\pi}) + \sum_{q=1}^{Q} \pi_q KL(\beta_{1,1}(q)\|\tilde{\beta}_{1,1}(q)) \quad (10)$$

The term $KL(\beta_{1,1}(q)\|\tilde{\beta}_{1,1}(q))$ from the right-hand side of equation (10), may be computed recursively. For example, the term may be computed based on an extension of Baum-Welch algorithm by considering the following cases, where each case corresponds to one of the node arrangements depicted in FIG. 3:

In reference to node arrangement 310, if $(i,j)$ is a leaf in $T(i, j)$ that has no child node, the term may be calculated according to:

$$\beta_{i,j}(q) = P(o_{i,j}|s_{i,j}=q) \quad (11)$$

For notation purposes, $N(o_{i,j}^k|\mu_{k,l}^q, \Sigma_{k,l}^q)$, and $N(o_{i,j}^k|\tilde{\mu}_{k,l}^q, \tilde{\Sigma}_{k,l}^q)$ may be denoted by $N_{i,j}^K$ and $\tilde{N}_{i,j}^K$, respectively. Next, by substituting equation (4) into the above equation (11), the KLD can be computed as:

$$KL(\beta_{i,j}(q)\|\tilde{\beta}_{i,j}(q)) = KL\left(\prod_{k=1}^{M}\sum_{l=1}^{N}\lambda_{k,l}^q N_{k,l}^q \middle\| \prod_{k=1}^{M}\sum_{l=1}^{N}\tilde{\lambda}_{k,l}^q \tilde{N}_{k,l}^q\right) \quad (12)$$

$$= \sum_{k=1}^{M} KL\left(\sum_{l=1}^{N}\lambda_{k,l}^q N_{k,l}^q \middle\| \sum_{l=1}^{N}\tilde{\lambda}_{k,l}^q \tilde{N}_{k,l}^q\right) \leq$$

$$\sum_{k=1}^{M}\left\{KL(\lambda_{k,\cdot}^q\|\tilde{\lambda}_{k,\cdot}^q) + \sum_{l=1}^{N}\lambda_{k,l}^q KL(N_{k,l}^q\|\tilde{N}_{k,l}^q)\right\}$$

where $$KL(\lambda_{k,\cdot}^q\|\tilde{\lambda}_{k,\cdot}^q) = \sum_{l=1}^{N}\lambda_{k,l}^q \log\frac{\lambda_{k,l}^q}{\tilde{\lambda}_{k,l}^q}.$$

Here, the second equality follows the chain rule for KLD and the inequality comes from the lemma.

In reference to node arrangement 320, if $(i,j)$ has only a horizontal successor, we have the following recursive equation:

$$\beta_{i,j}(q) = P(o_{i,j}|s_{i,j}=q)\sum_{q'=1}^{Q}\alpha_{q,q'}^H \beta_{i,j+1}(q') \quad (13)$$

thus we have:

$$KL(\beta_{i,j}(q)\|\tilde{\beta}_{i,j}(q)) = KL(P(o_{i,j}|s_{i,j}=q,\Theta)\|P(o_{i,j}|s_{i,j}=q,\tilde{\Theta})) + \qquad (14)$$

$$KL\left(\sum_{q'=1}^{Q}\alpha_{q,q'}^{H}\beta_{i,j+1}(q')\|\sum_{q'=1}^{Q}\tilde{\alpha}_{q,q'}^{H}\tilde{\beta}_{i,j+1}(q')\right) \le$$

$$\sum_{k=1}^{M}\left\{KL(\lambda_{k,.}^{q}\|\tilde{\lambda}_{k,.}^{q}) + \sum_{l=1}^{N}\lambda_{k,l}^{q}KL(N_{k,l}^{q}\|\tilde{N}_{k,l}^{q})\right\} +$$

$$KL(\alpha_{q,.}^{H}\|\tilde{\alpha}_{q,.}^{H}) + \sum_{q'=1}^{H}\alpha_{q,q'}^{H}KL(\beta_{i,j+1}(q')\|\tilde{\beta}_{i,j+1}(q'))$$

Where $$KL(\alpha_{q,.}^{H}\|\tilde{\alpha}_{q,.}^{H}) = \sum_{l=1}^{Q}\alpha_{q,l}^{H}\log\frac{\alpha_{q,l}^{H}}{\tilde{\alpha}_{q,l}^{H}}$$

accounts for discrimination information of the horizontal spatial structure between the respective two images. In this example, the first equality follows the chain rule for KLD and the inequality comes from the lemma.

Similarly, and in reference to node arrangement 330, if (i,j) has only a vertical successor, we have:

$$KL(\beta_{i,j}(q)\|\tilde{\beta}_{i,j}(q)) \le \sum_{k=1}^{M}\{KL(\lambda_{k,.}^{q}\|\tilde{\lambda}_{k,.}^{q}) + \sum_{l=1}^{N}\lambda_{k,l}^{q}KL(N_{k,l}^{q}\|\tilde{N}_{k,l}^{q})\} + \qquad (15)$$

$$KL(\alpha_{q,.}^{V}\|\tilde{\alpha}_{q,.}^{V}) + \sum_{q'=1}^{Q}\alpha_{q,q'}^{V}KL(\beta_{i+1,j}(q')\|\tilde{\beta}_{i+1,j}(q'))$$

In similar fashion to the previous example, $$KL(\alpha_{q,.}^{V}\|\tilde{\alpha}_{q,.}^{V}) = \sum_{l=1}^{Q}\alpha_{q,l}^{V}\log\frac{\alpha_{q,l}^{V}}{\tilde{\alpha}_{q,l}^{V}}$$

accounts for the discrimination of the vertical spatial structure between the two images.

Referring now to node arrangement 340, if (i,j) has both a horizontal and a vertical successor, we have:

$$\beta_{i,j}(q) = P(o_{i,j}|s_{i,j}=q,\Theta)\cdot\left(\sum_{q'=1}^{Q}\alpha_{q,q'}^{H}\beta_{i,j+1}(q')\right)\cdot\left(\sum_{q'=1}^{Q}\alpha_{q,q'}^{V}\beta_{i+1,j}(q')\right) \qquad (16)$$

resulting in:

$$KL(\beta_{i,j}(q)\|\tilde{\beta}_{i,j}(q)) = KL(P(o_{i,j}|s_{i,j}=q,\Theta)\|P(o_{i,j}|s_{i,j}=q,\tilde{\Theta})) + \qquad (17)$$

$$KL\left(\sum_{q'=1}^{Q}\alpha_{q,q'}^{H}\beta_{i,j+1}(q')\|\sum_{q'=1}^{Q}\tilde{\alpha}_{q,q'}^{H}\tilde{\beta}_{i,j+1}(q')\right) \le$$

-continued $$\sum_{k=1}^{M}\left\{KL(\lambda_{k,.}^{q}\|\tilde{\lambda}_{k,.}^{q}) + \sum_{l=1}^{N}\lambda_{k,l}^{q}KL(N_{k,l}^{q}\|\tilde{N}_{k,l}^{q})\right\} +$$

$$KL(\alpha_{q,.}^{H}\|\tilde{\alpha}_{q,.}^{H}) + \sum_{q'=1}^{Q}\alpha_{q,q'}^{H}KL(\beta_{i,j+1}(q')\|\tilde{\beta}_{i,j+1}(q')) +$$

$$KL(\alpha_{q,.}^{V}\|\tilde{\alpha}_{q,.}^{V}) + \sum_{q'=1}^{Q}\alpha_{q,q'}^{V}KL(\beta_{i+1,j}(q')\|\tilde{\beta}_{i+1,j}(q'))$$

Note that, since a DT-HMM has a tree structure, two sub trees T(i+1,j) and T(i,j+1) may have no common nodes. Therefore the two distributions $$\left(\sum_{q'=1}^{Q}\alpha_{q,q'}^{H}\beta_{i,j+1}(q')\right) \text{ and } \left(\sum_{q'=1}^{Q}\alpha_{q,q'}^{V}\beta_{i+1,j}(q')\right)$$

may be independent, thus in the first equality we can apply the chain rule for KLD.

Finally, the KLD between the two d-dimensional normal distributions $N_{k,l}^{q}, \tilde{N}_{k,l}^{q}$ in the above equations has a closed-from expression as shown in the following formula:

$$KL(N_{k,l}^{q}\|\tilde{N}_{k,l}^{q}) = \frac{1}{2}\left(\begin{array}{l}\log\frac{|\tilde{\Sigma}_{k,l}^{q}|}{|\Sigma_{k,l}^{q}|} + Tr((\tilde{\Sigma}_{k,l}^{q})^{-1}\Sigma_{k,l}^{q}) + \\ (\mu_{k,l}^{q} - \tilde{\mu}_{k,l}^{q})^{T}(\tilde{\Sigma}_{k,l}^{q})^{-1}(\mu_{k,l}^{q} - \tilde{\mu}_{k,l}^{q}) - d\end{array}\right) \qquad (18)$$

Figure 4:
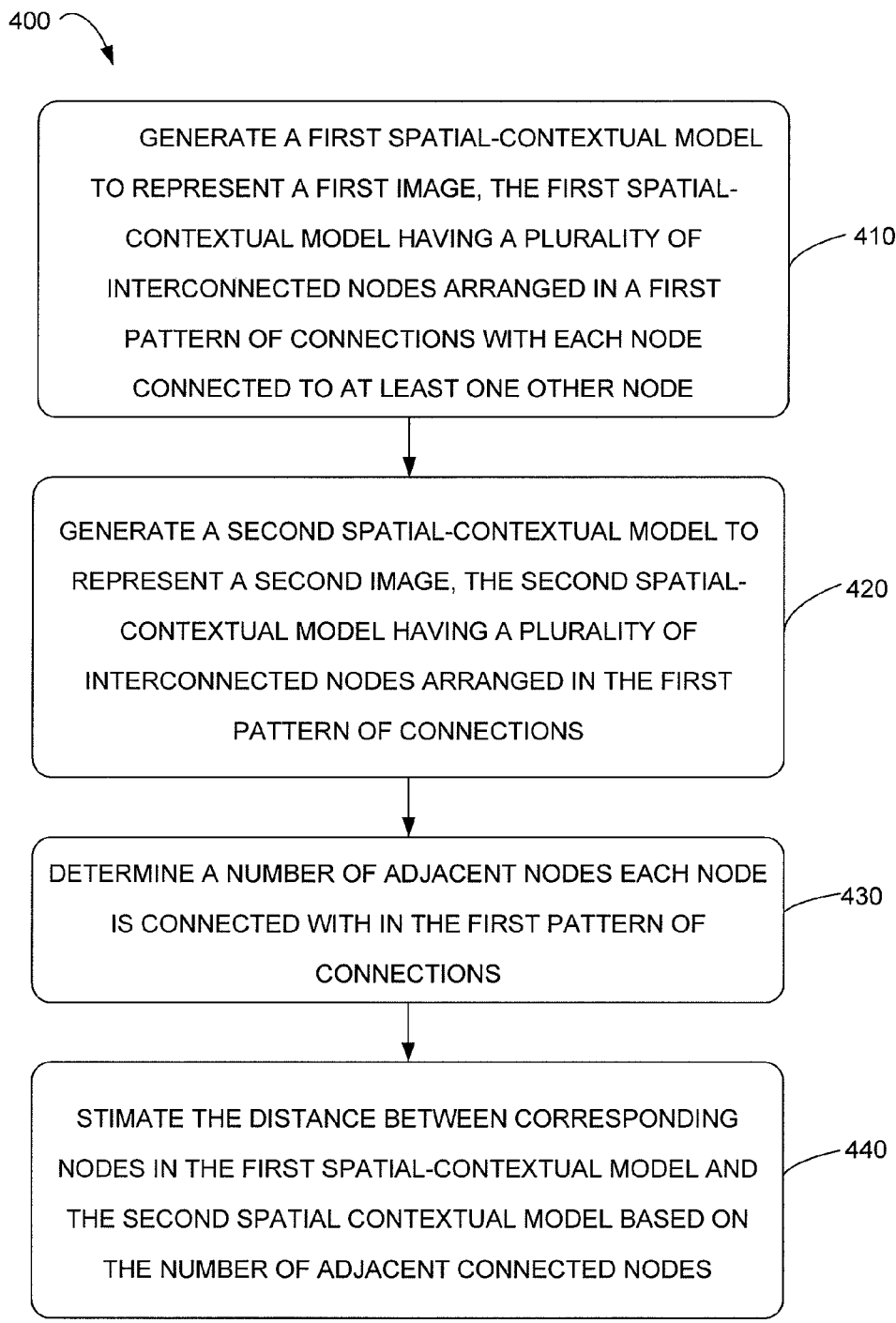
FIG. 4 shows a process flow depicting an embodiment of a method for kernelized spatial-contextual image classification.

Referring now to FIG. 4, a process flow depicting an embodiment of a method 400 for categorizing a plurality of unlabeled images is shown. First, as indicated in block 410, method 400 comprises generating a first spatial-contextual model to represent a first image, the first spatial-contextual model having a plurality of interconnected nodes arranged in a first pattern of connections with each node connected to at least one other node. In one example, a spatial-contextual model may be a Dependency Tree Hidden Markov Model (DT-HMM).

Method 400 also comprises generating a second spatial-contextual model to represent a second image, the second spatial-contextual model having a plurality of interconnected nodes arranged in the first pattern of connections, as indicated in block 420.

Next, method 400 comprises determining a relationship of adjacent nodes that each node is connected with in the first pattern of connections, as indicated at 430. Then, as depicted in block 440, method 400 comprises calculating a distance between corresponding nodes in the first spatial-contextual model and the second spatial-contextual model based on the relationship of adjacent connected nodes to determine a distance between the first image and the second image.

In some embodiments, method 400 may further comprise training a Universal Reference Model from a plurality of referential images, and adapting the first spatial-contextual model and the second spatial-contextual model to the Universal Reference Model prior to calculate a distance between corresponding nodes. In one embodiment, calculating a distance between corresponding nodes involves estimating the distance using an upper-bounded Kullback-Leibler Divergence based on the relationship of adjacent nodes.

It will be appreciated that the embodiments described herein may be implemented, for example, via computer-executable instructions or code, such as programs, stored on a computer-readable storage medium and executed by a computing device. Generally, a program involves routines, objects, components, or data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, personal computers, servers, laptop computers, hand-held devices, cellular phones, microprocessor-based programmable consumer electronics and other computer image processing devices.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for categorizing a plurality of unlabeled images, the method comprising:
   on a computing device:
      generating a first spatial-contextual model to represent a first image, the first spatial-contextual model having a plurality of interconnected nodes arranged in a first pattern of connections with each node connected to at least one other node;
      generating a second spatial-contextual model to represent a second image, the second spatial-contextual model having a plurality of interconnected nodes arranged in the first pattern of connections;
      determining a relationship of adjacent nodes that each node is connected with in the first pattern of connections; and
      calculating a distance between corresponding nodes in the first spatial-contextual model and the second spatial-contextual model based on the relationship of adjacent connected nodes to determine a distance between the first image and the second image.

2. The method of claim 1, wherein calculating a distance between corresponding nodes involves estimating the distance using an upper-bounded Kullback-Leibler Divergence based on the relationship of adjacent nodes.

3. The method of claim 1, wherein the first spatial-contextual model and the second spatial-contextual model are each a Dependency Tree Hidden Markov Model (DT-HMM).

4. The method of claim 2, wherein the upper-bounded Kullback-Leibler Divergence is calculated using a formula:

$$KL(\Theta \| \tilde{\Theta}) = KL\left(\sum_{q=1}^{Q} \pi_q \beta_{1,1}(q) \| \sum_{q=1}^{Q} \tilde{\pi}_q \tilde{\beta}_{1,1}(q)\right) \le KL(\pi \| \tilde{\pi}) + \sum_{q=1}^{Q} \pi_q KL(\beta_{1,1}(q) \| \tilde{\beta}_{1,1}(q)).$$

5. The method of claim 4, further comprising:
   training a Universal Reference Model from a plurality of referential images; and
   adapting the first spatial-contextual model and the second spatial-contextual model to the Universal Reference Model prior to calculating a distance between corresponding nodes.

6. The method of claim 4, wherein if each of the corresponding nodes are not connected with a successor node, the method further comprises calculating the upper-bounded Kullback-Leibler Divergence using a formula:

$$KL(\beta_{i,j}(q) \| \tilde{\beta}_{i,j}(q)) = KL\left(\prod_{k=1}^{M} \sum_{l=1}^{N} \lambda_{k,l}^q N_{k,l}^q \| \prod_{k=1}^{M} \sum_{l=1}^{N} \tilde{\lambda}_{k,l}^q \tilde{N}_{k,l}^q\right)$$
$$= \sum_{k=1}^{M} KL\left(\sum_{l=1}^{N} \lambda_{k,l}^q N_{k,l}^q \| \sum_{l=1}^{N} \tilde{\lambda}_{k,l}^q \tilde{N}_{k,l}^q\right) \le$$
$$\sum_{k=1}^{M} \left\{ KL(\lambda_{k,\cdot}^q \| \tilde{\lambda}_{k,\cdot}^q) + \sum_{l=1}^{N} \lambda_{k,l}^q KL(N_{k,l}^q \| \tilde{N}_{k,l}^q) \right\}.$$

7. The method of claim 4, wherein if each of the corresponding nodes are connected with a vertical successor node, the method further comprises calculating the upper-bounded Kullback-Leibler Divergence using a formula:

$$KL(\beta_{i,j}(q) \| \tilde{\beta}_{i,j}(q)) \le \sum_{k=1}^{M} \left\{ KL(\lambda_{k,\cdot}^q \| \tilde{\lambda}_{k,\cdot}^q) + \sum_{l=1}^{N} \lambda_{k,l}^q KL(N_{k,l}^q \| \tilde{N}_{k,l}^q) \right\} +$$
$$KL(\alpha_{q,\cdot}^V \| \tilde{\alpha}_{q,\cdot}^V) + \sum_{q'=1}^{Q} \alpha_{q,q'}^V KL(\beta_{i+1,j}(q') \| \tilde{\beta}_{i+1,j}(q')).$$

8. The method of claim 4, wherein if each of the corresponding nodes are connected with a horizontal successor node, the method further comprises calculating the upper-bounded Kullback-Leibler Divergence using a formula:

$$KL(\beta_{i,j}(q) \| \tilde{\beta}_{i,j}(q)) = KL(P(o_{i,j} | s_{i,j} = q, \Theta) \| P(o_{i,j} | s_{i,j} = q, \tilde{\Theta})) +$$
$$KL\left(\sum_{q'=1}^{Q} \alpha_{q,q'}^H \beta_{i,j+1}(q') \| \sum_{q'=1}^{Q} \tilde{\alpha}_{q,q'}^H \tilde{\beta}_{i,j+1}(q')\right) \le$$
$$\sum_{k=1}^{M} \left\{ KL(\lambda_{k,\cdot}^q \| \tilde{\lambda}_{k,\cdot}^q) + \sum_{l=1}^{N} \lambda_{k,l}^q KL(N_{k,l}^q \| \tilde{N}_{k,l}^q) \right\} +$$
$$KL(\alpha_{q,\cdot}^H \| \tilde{\alpha}_{q,\cdot}^H) + \sum_{q'=1}^{Q} \alpha_{q,q'}^H KL(\beta_{i,j+1}(q') \| \tilde{\beta}_{i,j+1}(q')).$$

9. The method of claim 4, wherein if each of the corresponding nodes are connected with a vertical successor node and a horizontal successor node, the method further comprises calculating the upper-bounded Kullback-Leibler Divergence using a formula:

$$KL(\beta_{i,j}(q)\|\tilde{\beta}_{i,j}(q)) = KL(P(o_{i,j}|s_{i,j}=q,\Theta)\|P(o_{i,j}|s_{i,j}=q,\tilde{\Theta})) +$$

$$KL\left(\sum_{q'=1}^{Q}\alpha_{q,q'}^{H}\beta_{i,j+1}(q')\|\sum_{q'=1}^{Q}\tilde{\alpha}_{q,q'}^{H}\tilde{\beta}_{i,j+1}(q')\right) \le$$

$$\sum_{k=1}^{M}\left\{KL(\lambda_{k,.}^{q}\|\tilde{\lambda}_{k,.}^{q}) + \sum_{l=1}^{N}\lambda_{k,l}^{q}KL(N_{k,l}^{q}\|\tilde{N}_{k,l}^{q})\right\} +$$

$$KL(\alpha_{q,.}^{H}\|\tilde{\alpha}_{q,.}^{H}) + \sum_{q'=1}^{Q}\alpha_{q,q'}^{H}KL(\beta_{i,j+1}(q')\|\tilde{\beta}_{i,j+1}(q')) +$$

$$KL(\alpha_{q,.}^{V}\|\tilde{\alpha}_{q,.}^{V}) + \sum_{q'=1}^{Q}\alpha_{q,q'}^{V}KL(\beta_{i+1,j}(q')\|\tilde{\beta}_{i+1,j}(q')).$$

10. A computer-readable storage medium comprising stored instructions executable by a computing device to categorize a plurality of unlabeled images, the stored instructions executed by the computing device to perform a method comprising:
generating a first spatial-contextual model to represent a first image, the first spatial-contextual model having a plurality of interconnected nodes arranged in a first pattern of connections with each node connected to at least one other node;
generating a second spatial-contextual model to represent a second image, the second spatial-contextual model having a plurality of interconnected nodes arranged in the first pattern of connections;
training a Universal Reference Model from a plurality of referential images;
adapting the first spatial-contextual model and the second spatial-contextual model to the Universal Reference Model;
determining a relationship of adjacent nodes that each node is connected with in the first pattern of connections; and
calculating a distance between corresponding nodes in the first spatial-contextual model and the second spatial-contextual model based on the relationship of adjacent connected nodes.

11. The computer-readable storage medium of claim 10, wherein adapting the first spatial-contextual model and the second spatial-contextual model to the Universal Reference Model comprises a Maximum A Posteriori technique.

12. The computer-readable storage medium of claim 10, wherein calculating a distance between corresponding nodes involves estimating the distance using an upper-bounded Kullback-Leibler Divergence based on the relationship of adjacent nodes.

13. The computer-readable storage medium of claim 10, wherein the first spatial-contextual model and the second spatial-contextual model are each a Dependency Tree Hidden Markov Model (DT-HMM).

14. The computer-readable storage medium of claim 12, wherein the upper-bounded Kullback-Leibler Divergence is calculated using a formula:

$$KL(\Theta\|\tilde{\Theta}) =$$

$$KL\left(\sum_{q=1}^{Q}\pi_{q}\beta_{1,1}(q)\|\sum_{q=1}^{Q}\tilde{\pi}_{q}\tilde{\beta}_{1,1}(q)\right) \le KL(\pi\|\tilde{\pi}) + \sum_{q=1}^{Q}\pi_{q}KL(\beta_{1,1}(q)\|\tilde{\beta}_{1,1}(q)).$$

15. The computer-readable storage medium of claim 14, wherein if each of the corresponding nodes are not connected with a successor node, the medium further comprises instructions for calculating the upper-bounded Kullback-Leibler Divergence using a formula:

$$KL(\beta_{i,j}(q)\|\tilde{\beta}_{i,j}(q)) = KL\left(\prod_{k=1}^{M}\sum_{l=1}^{N}\lambda_{k,l}^{q}N_{k,l}^{q}\|\prod_{k=1}^{M}\sum_{l=1}^{N}\tilde{\lambda}_{k,l}^{q}\tilde{N}_{k,l}^{q}\right)$$

$$= \sum_{k=1}^{M}KL\left(\sum_{l=1}^{N}\lambda_{k,l}^{q}N_{k,l}^{q}\|\sum_{l=1}^{N}\tilde{\lambda}_{k,l}^{q}\tilde{N}_{k,l}^{q}\right) \le$$

$$\sum_{k=1}^{M}\left\{KL(\lambda_{k,.}^{q}\|\tilde{\lambda}_{k,.}^{q}) + \sum_{l=1}^{N}\lambda_{k,l}^{q}KL(N_{k,l}^{q}\|\tilde{N}_{k,l}^{q})\right\}.$$

16. The computer-readable storage medium of claim 14, wherein if each of the corresponding nodes are connected with a horizontal successor node, the medium further comprises instructions for calculating the upper-bounded Kullback-Leibler Divergence using a formula:

$$KL(\beta_{i,j}(q)\|\tilde{\beta}_{i,j}(q)) = KL(P(o_{i,j}|s_{i,j}=q,\Theta)\|P(o_{i,j}|s_{i,j}=q,\tilde{\Theta})) +$$

$$KL\left(\sum_{q'=1}^{Q}\alpha_{q,q'}^{H}\beta_{i,j+1}(q')\|\sum_{q'=1}^{Q}\tilde{\alpha}_{q,q'}^{H}\tilde{\beta}_{i,j+1}(q')\right) \le$$

$$\sum_{k=1}^{M}\left\{KL(\lambda_{k,.}^{q}\|\tilde{\lambda}_{k,.}^{q}) + \sum_{l=1}^{N}\lambda_{k,l}^{q}KL(N_{k,l}^{q}\|\tilde{N}_{k,l}^{q})\right\} +$$

$$KL(\alpha_{q,.}^{H}\|\tilde{\alpha}_{q,.}^{H}) + \sum_{q'=1}^{Q}\alpha_{q,q'}^{H}KL(\beta_{i,j+1}(q')\|\tilde{\beta}_{i,j+1}(q')).$$

17. The computer-readable storage medium of claim 13, wherein if each of the corresponding nodes are connected with a vertical successor node, the medium further comprises instructions for calculating the upper-bounded Kullback-Leibler Divergence using a formula:

$$KL(\beta_{i,j}(q)\|\tilde{\beta}_{i,j}(q)) \le \sum_{k=1}^{M}\left\{KL(\lambda_{k,.}^{q}\|\tilde{\lambda}_{k,.}^{q}) + \sum_{l=1}^{N}\lambda_{k,l}^{q}KL(N_{k,l}^{q}\|\tilde{N}_{k,l}^{q})\right\} +$$

$$KL(\alpha_{q,.}^{V}\|\tilde{\alpha}_{q,.}^{V}) + \sum_{q'=1}^{Q}\alpha_{q,q'}^{V}KL(\beta_{i,j+1}(q')\|\tilde{\beta}_{i,j+1}(q')).$$

18. The computer-readable storage medium of claim 13, wherein if each of the corresponding nodes are connected with a vertical successor node and a horizontal successor node, the medium further comprises instructions for calculating the upper-bounded Kullback-Leibler Divergence using a formula:

$$KL(\beta_{i,j}(q)\|\tilde{\beta}_{i,j}(q)) = KL(P(o_{i,j}|s_{i,j}=q,\Theta)\|P(o_{i,j}|s_{i,j}=q,\tilde{\Theta})) +$$

$$KL\left(\sum_{q'=1}^{Q}\alpha_{q,q'}^{H}\beta_{i,j+1}(q')\|\sum_{q'=1}^{Q}\tilde{\alpha}_{q,q'}^{H}\tilde{\beta}_{i,j+1}(q')\right) \leq$$

$$\sum_{k=1}^{M}\left\{KL(\lambda_{k,\cdot}^{q}\|\tilde{\lambda}_{k,\cdot}^{q}) + \sum_{l=1}^{N}\lambda_{k,l}^{q}KL(N_{k,l}^{q}\|\tilde{N}_{k,l}^{q})\right\} +$$

$$KL(\alpha_{q,\cdot}^{H}\|\tilde{\alpha}_{q,\cdot}^{H}) + \sum_{q'=1}^{Q}\alpha_{q,q'}^{H}KL(\beta_{i,j+1}(q')\|\tilde{\beta}_{i,j+1}(q')) +$$

$$KL(\alpha_{q,\cdot}^{V}\|\tilde{\alpha}_{q,\cdot}^{V}) + \sum_{q'=1}^{Q}\alpha_{q,q'}^{V}KL(\beta_{i+1,j}(q')\|\tilde{\beta}_{i+1,j}(q')).$$

19. A system to categorize a plurality of unlabeled images, the system comprising:
an input;
a memory including stored instructions; and
a processor in communication with the input and the memory, the processor being configured to executed the stored instructions to implement:
a model generation module configured to generate a first dependency tree hidden Markov model to represent a first image, the model generation module further configured to generate a second dependency tree hidden Markov model to represent a second image;
a distance module in communication with the model generation module, the distance module configured to calculate an image distance between the first dependency tree hidden Markov model and the second dependency tree hidden Markov model; and
a categorization module to receive the image distance and to generate a kernelized spatial-contextual model using the image distance.

20. The system of claim 19, further comprising an adaptation module in communication with the categorization module, the adaptation module being configured to train a universal reference model from a plurality of representative images and the categorization module being further configured to generate a set of kernelized spatial-contextual models.

* * * * *